(12) United States Patent
Mayer et al.

(10) Patent No.: US 6,317,815 B1
(45) Date of Patent: *Nov. 13, 2001

(54) METHOD AND APPARATUS FOR FORMATTING DATA IN A STORAGE DEVICE

(75) Inventors: Robert Mayer, Brighton, MA (US); David McKenzie, Lakewood, CA (US)

(73) Assignee: EMC Corporation, Hopkinton, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/001,046

(22) Filed: Dec. 30, 1997

(51) Int. Cl.[7] .................................................. G06F 12/02
(52) U.S. Cl. ............................................ 711/165; 711/162
(58) Field of Search ........................ 711/111, 112, 113, 711/114, 161, 162, 165; 707/206

(56) References Cited

U.S. PATENT DOCUMENTS

| | | | |
|---|---|---|---|
| 5,212,784 | 5/1993 | Sparks | 395/575 |
| 5,321,826 * | 6/1994 | Ushiro | 711/162 |
| 5,469,573 * | 11/1995 | McGill, III et al. | 395/712 |
| 5,537,533 | 7/1996 | Staheli et al. | 395/182.03 |
| 5,544,347 | 8/1996 | Yanai et al. | 395/489 |
| 5,655,119 * | 8/1997 | Davy | 707/200 |
| 5,832,513 * | 11/1998 | Kennedy | 707/202 |
| 5,835,953 | 11/1998 | Ohran | 711/162 |
| 5,875,481 * | 2/1999 | Ashton et al. | 711/165 |
| 5,920,896 * | 7/1999 | Grimsrud et al. | 711/165 |
| 5,933,653 | 8/1999 | Ofek | 395/826 |

OTHER PUBLICATIONS

Symmetrix Product Annoucement,"Symmetrix Data Migration Services (SDMS)", Dec. 5, 1995, P 10–13.*

Black, Uyless, "Computer Networks: Protocols, Standards and Interfaces", pp. 159–161, 1993.

* cited by examiner

*Primary Examiner*—Kevin L. Ellis
(74) *Attorney, Agent, or Firm*—Wolf, Greenfield & Sacks, P.C.

(57) ABSTRACT

A method and apparatus for reformatting a main storage device associated with a computer system. The storage device is reformatted by making use of a secondary storage device on which is stored a copy of the data stored on the main storage device. A reformatting process is run on the secondary storage device while the main computer system continues normal operation. When the reformatting process is completed, the secondary storage device is updated with the updates that were made on the main storage system while the reformatting process was run on the secondary system. Thereafter, the reformatted and updated data is either transferred to the main storage device, or the main storage device is physically replaced with the secondary storage device. In another aspect, non-standard programming techniques are employed to provide access to non-configured disc drives coupled to an AS/400.

53 Claims, 7 Drawing Sheets

METHOD AND APPARATUS FOR FORMATTING DATA IN A STORAGE DEVICE

FIELD OF THE INVENTION

The present invention is directed to a method and apparatus for reformatting data, for defragmentation or other purposes, in a storage device (e.g., a disk drive) in a computer system. More particularly, the present invention is directed to a method and apparatus for reformatting data while minimizing the down time and performance impact on the computer system. Another aspect of the present invention is directed to the reading of non-configured drives on an AS/400.

BACKGROUND OF THE INVENTION

In a computer system that includes a host central processing unit (CPU) and a main storage device such as a disk drive storage system, data fragmentation is a problem that can affect system performance. Data fragmentation can occur in a disk drive storage system that includes a single large disk drive providing main storage for the CPU, or a storage system that includes a plurality of smaller disk drives arranged to perform the same function. An example of the latter type of disk drive storage system is the SYMMETRIX line of disk arrays, available from EMC Corporation, Hopkinton Mass. Fragmentation results from the fact that all data in a logical file stored in a storage device is not necessarily written to the device at the same time, and therefore, data within a single logical file can be stored on different physical areas of the device.

FIG. 1 illustrates a storage device 1 including a plurality of schematically represented physical areas 2–8. When a logical file LF1 (represented by cross-hatching) is first written to the storage device 1, it may be written to the first available physical space, such as physical space 2. As additional logical files are written to the storage device, they are assigned to the next available physical space on the device, which begins to fill up as represented by the dotted areas in FIG. 1. Thus, if additional information is later added to logical file LF1, no space is available for that information in physical area 2, so the additional information is written to the storage device 1 at a different physical location from the portion of LF1 initially written. In the example shown in FIG. 1, an addition to logical file LF1 is written to a portion of physical area 5 on the storage device. It is such separation of a single logical file into two or more physical areas on a storage device that is known as data fragmentation.

The fragmentation of data on a storage device can negatively impact the performance of the system because separate input/output (I/O) operations are required to read different physical locations on the storage device. Thus, referring to the simple example of FIG. 1, due to the fragmentation of the logical file LF1, two I/O operations are required to read the logical file, thereby increasing the access time over that which would be required if the logical file LF1 was stored on a contiguous physical portion of the disk drive and could be read using a single I/O operation. It should be recognized that in practical applications, the fragmentation problem is far worse than that depicted in the simple example of FIG. 1, such that logical files can be fragmented into a large number of different physical sections of a storage device, thereby significantly decreasing the performance of the storage system.

Data fragmentation is a potential problem in all systems wherein data is stored to a disk or other storage device. However, due to the manner in which some systems control the writing of data to a main storage device, the fragmentation problem is magnified. An example of such a system is the AS/400 sold by International Business Machines (IBM). The AS/400 is a host CPU that is typically connected to a disk drive storage system that includes a plurality of disk drives that together provide main storage for the system. In the AS/400, when a large logical file is written to the storage system, the file is striped across the plurality of disks, i.e., the logical file is broken up into a plurality of smaller segments that are respectively written to the plurality of disks. Striping is performed so that when the logical file is read, the multiple disk drives can process portions of the read for the large volume simultaneously, with expectations of improved performance.

The striping of logical files across multiple disks aggravates the data fragmentation problem. In particular, by splitting each logical file up into smaller segments, each disk fills with smaller segments than if the data was not striped, which causes fragmentation problems to develop more rapidly. Furthermore, unlike many other systems, the operating system in the AS/400 controls the allocation of logical files to the physical areas on the disk drives, and does not give any flexibility or control over this allocation to the application software or any level of software below the operating system level. Therefore, the allocation of the logical files cannot be controlled to minimize data fragmentation.

Many computer systems provide some facility for processing the data stored on a disk drive to reduce data fragmentation after it has occurred. In the AS/400, this facility is called a "reload". The reloading of a disk drive or group of disks involves two steps. Initially, a full system back-up is run on the storage device system, such that all of the data on the storage device is backed up to a temporary storage medium such as a tape or another disk drive. This can be done using standard AS/400 resources, but requires that the system be rebooted and that all other activity on the system be halted. This takes approximately 8–20 hours for a storage device of approximately 400 gigabytes. After the back-up is complete, the data is reloaded onto the system using reload software provided with the AS/400. The reload process reallocates the logical files written back to the disk drive so that each logical file is written to a contiguous physical section of the disk drive, or if spread across multiple disks, occupies contiguous physical space within each. The reload process can take approximately 10–30 hours for a storage device of approximately 400 gigabytes. When the reload software is running, the system is not available for normal operation.

Although most computer systems include a facility (such as the AS/400 reload) for defragmenting data on a storage device, such facilities are infrequently used by customers because they require that the system be brought off-line and may keep the system down for approximately 18–50 hours or more. This is particularly disadvantageous for business applications wherein the computer system is expected to essentially manage itself without significant control by the customer, and without requiring that work be halted to run system management operations. As a result, customers will often defragment their storage system only very infrequently, resulting in reduced performance of the storage system. Some systems do provide a reload facility that works in a background mode, but this process typically takes months, making it impractical for most users.

In view of the foregoing, it is an object of the present invention to provide an improved method and apparatus for reloading data on a storage device, thereby improving the defragmentation process.

SUMMARY OF THE INVENTION

The foregoing objects are achieved in one illustrative embodiment of the invention, wherein a method is provided of reformatting data stored on a source storage device in a remote data facility that includes the source storage device, a source processor coupled to the source storage device, and a target storage device coupled to the source storage device. The source storage device stores data in an initial format, and the target storage device includes a copy of the data stored on the source storage device. The method comprises the steps of: (A) transferring the data in the initial format from the target storage device onto a temporary storage medium; (B) reloading the data from the temporary storage medium onto the target storage device in a reformatted format; and (C) transferring the reformatted data from the target storage device to the source storage device.

In another illustrative embodiment of the invention, a method is provided of reformatting data accessible to a main processor from an initial format to a reformatted format, the data in the initial format being stored in a main storage device coupled to the main processor. The method comprises the steps of: (A) transferring the data in the initial format from the main storage device onto a temporary storage medium; (B) reloading the data from the temporary storage medium onto a secondary storage device in the reformatted format; and (C) coupling the secondary storage device to the main processor so that the reformatted data on the secondary storage device is accessible to the main processor.

Another illustrative embodiment of the invention is directed to a method of reading a first set of objects stored on a first storage device, the first set of objects having been created by a first AS/400. The method comprising steps of: (A) creating a mirrored set of objects on a second storage device coupled to a second AS/400, the mirrored set of objects being a mirror of the first set of objects stored on the first storage device; and (B) using the second AS/400 to read the mirrored set of objects from the second storage device.

A further illustrative embodiment of the invention is directed to a method of operating a system including an AS/400, at least one storage device coupled to the AS/400 as a non-configured storage device, and at least one storage device coupled to the AS/400 as a configured storage device, the at least one non-configured storage device storing a set of objects and at least one machine index identifying a location of the set of objects on the at least one non-configured storage device. The method comprises the step of copying the at least one machine index from the at least one non-configured storage device to the at least one configured storage device to create a copy of the at least one machine index.

A further illustrative embodiment of the invention is directed to a computer system, comprising an AS/400; at least one storage device, coupled to the AS/400 as a non-configured storage device, that stores a set of objects and at least one machine index identifying a location of the set of objects on the at least one non-configured storage device; and at least one storage device coupled to the AS/400 as a configured storage device. The AS/400 includes means for copying the at least one machine index from the at least one non-configured storage device to the at least one configured storage device to create a copy of the at least one machine index.

Another illustrative embodiment of the invention is directed to a computer system, comprising a first AS/400 and at least one storage device, coupled to the first AS/400, that stores at least one object that was created by a second AS/400 that is different from the first AS/400. The first AS/400 includes means for reading the at least one object from the at least one storage device.

A further illustrative embodiment of the invention is directed to a method of operating a system including an AS/400 and a storage device coupled to the AS/400 as a non-configured storage device, the storage device storing a set of objects. The method comprises a step of backing up the set of objects onto a back-up medium.

Another embodiment of the invention is directed to a computer system, comprising an AS/400 and a disc drive coupled to the AS/400 as a non-configured disc drive, the storage device storing a set of objects. The AS/400 includes back-up means for backing up the set of objects onto a back-up medium.

A further illustrative embodiment of the invention is directed to a computer system, comprising an AS/400; at least one storage device, coupled to the AS/400 as a non-configured storage device, that stores a set of objects and at least one machine index identifying a location of the set of objects on the at least one non-configured storage device; and at least one storage device, coupled to the AS/400 as a configured storage device, that stores a copy of the at least one machine index identifying a location of the set of objects on the at least one non-configured storage device.

Another illustrative embodiment of the invention is directed to a method of reformatting data stored on a source storage device in a system that includes the source storage device, a source AS/400 coupled to the source storage device, a target storage device coupled to the source storage device, and a target AS/400 coupled to the target storage device, the source storage device storing data in an initial format, the target storage device being coupled to the target AS/400 as a non-configured storage device and storing a copy of the data stored on the source storage device. The method comprises the steps of: (A) transferring the data in the initial format from the target storage device onto a temporary storage medium; (B) reconfiguring the target AS/400 so that the target storage device is a configured storage device; (C) reloading the data from the temporary storage medium onto the target storage device in a reformatted format; and (D) transferring the reformatted data from the target storage device to the source storage device. dr

DETAILED DESCRIPTION

The present invention is directed to a method and apparatus for facilitating the reformatting of a storage device in a computer system by minimizing the impact seen by the user of the system. In the exemplary embodiments discussed below, the computer system's CPU is referred to as an IBM AS/400. However, it should be understood that the present invention is not limited to use with this particular system, and can be used with any system in which it is desirable to reformat a storage device. Furthermore, in the illustrative embodiments discussed below, the storage device is a disk drive. However, as will be appreciated from the description below, the method and apparatus of the present invention can be used with any storage device in which either data fragmentation is a problem or data reformatting is desired for any other reason, and is not limited to use in reformatting data on disk drives.

One illustrative example of a system in which the present invention can be used is a remote data mirroring facility discussed below in connection with FIG. 2. However, it should be understood that the present invention can be employed in numerous other system configurations, and is not limited to use in a remote data mirroring facility.

Figure 1:
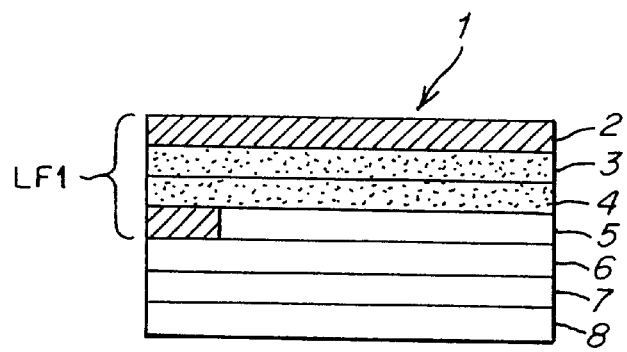
FIG. 1 is a schematic representation illustrating data fragmentation on a storage device.
Figure 2:
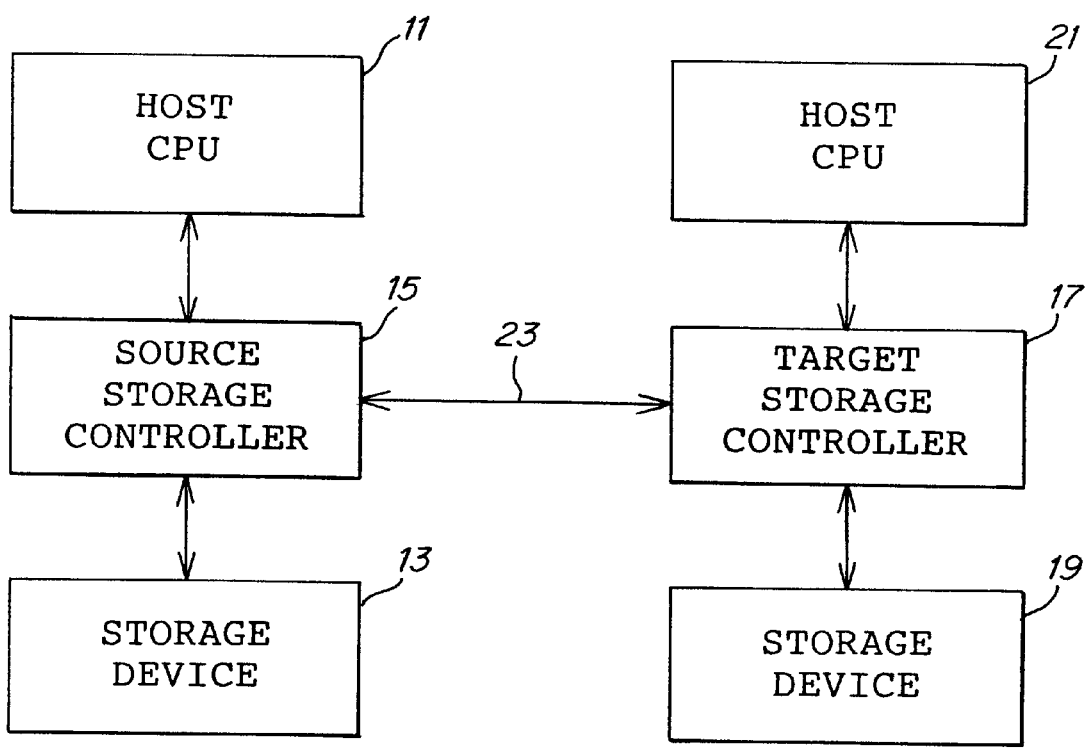
FIG. 2 is a block diagram of a source/target computer system on which the present invention can operate.

In the system shown in FIG. 2, a host CPU 11 is coupled to a storage device 13 through a source storage controller 15. The storage device 13 may be a large disk drive providing main storage for the host CPU 11, or it may be a plurality of smaller disk drives arranged to perform the same function, such as a storage device from the SYMMETRIX line of disk arrays discussed above. The data stored on storage device 13 may be crucial to the operation of host CPU 11. Therefore, a contingency solution is desirable in the event that a problem is experienced with storage device 13, to ensure that the stored data is not lost and to minimize the risk of CPU 11 being down due to problems with the storage device. One solution for protecting the data stored in the storage device 13 is to mirror that data in another storage device. FIG. 2 illustrates such a system, wherein the source storage controller 15 is coupled to a target storage controller 17 and an associated target storage device 19, via a source/target link 23. As data is written to storage device 13, it can also be written to storage device 19. If storage device 13 is destroyed or experiences an error that renders stored data unrecoverable, the data can be retrieved from the mirroring storage device 19. As shown in FIG. 2, the target storage controller 17 and storage device 19 can also optionally serve as the main storage system for a second host CPU 21.

Further details concerning an exemplary remote data facility (RDF) such as the one shown in FIG. 2 are included in following copending U.S. patent applications, each of which is incorporated herein by reference: Ser. No. 08/601,733 filed Feb. 15, 1996, entitled "METHOD AND APPARATUS FOR INTERFACING TWO REMOTELY DISPOSED DEVICES COUPLED VIA A TRANSMISSION MEDIUM", now U.S. Pat. No. 5,960,216; Ser. No. 08/656,036, filed May 31, 1996, entitled "METHOD AND APPARATUS FOR PERFORMING POINT IN TIME BACKUP OPERATION IN A COMPUTER SYSTEM", now U.S. Pat. No. 5,857,208; Ser. No. 08/657,760, filed May 31, 1996, entitled "METHOD AND APPARATUS FOR MIRRORING DATA IN A REMOTE DATA STORAGE SYSTEM", now U.S. Pat. No. 5,933,653; and Ser. No. 08/656,035, filed May 31, 1996, entitled "METHOD AND APPARATUS FOR INDEPENDENT OPERATION OF A REMOTE DATA FACILITY".

In a remote data facility such as the one shown in FIG. 2, a copy of the data stored on the source storage device 13 is maintained on the target storage device 19. In the embodiment of the present invention used in connection with a remote data facility, this aspect of the remote system is used advantageously to reformat (e.g., to defragment) data on the source storage device 13, while minimizing the impact on the source CPU 11.

Figure 3:
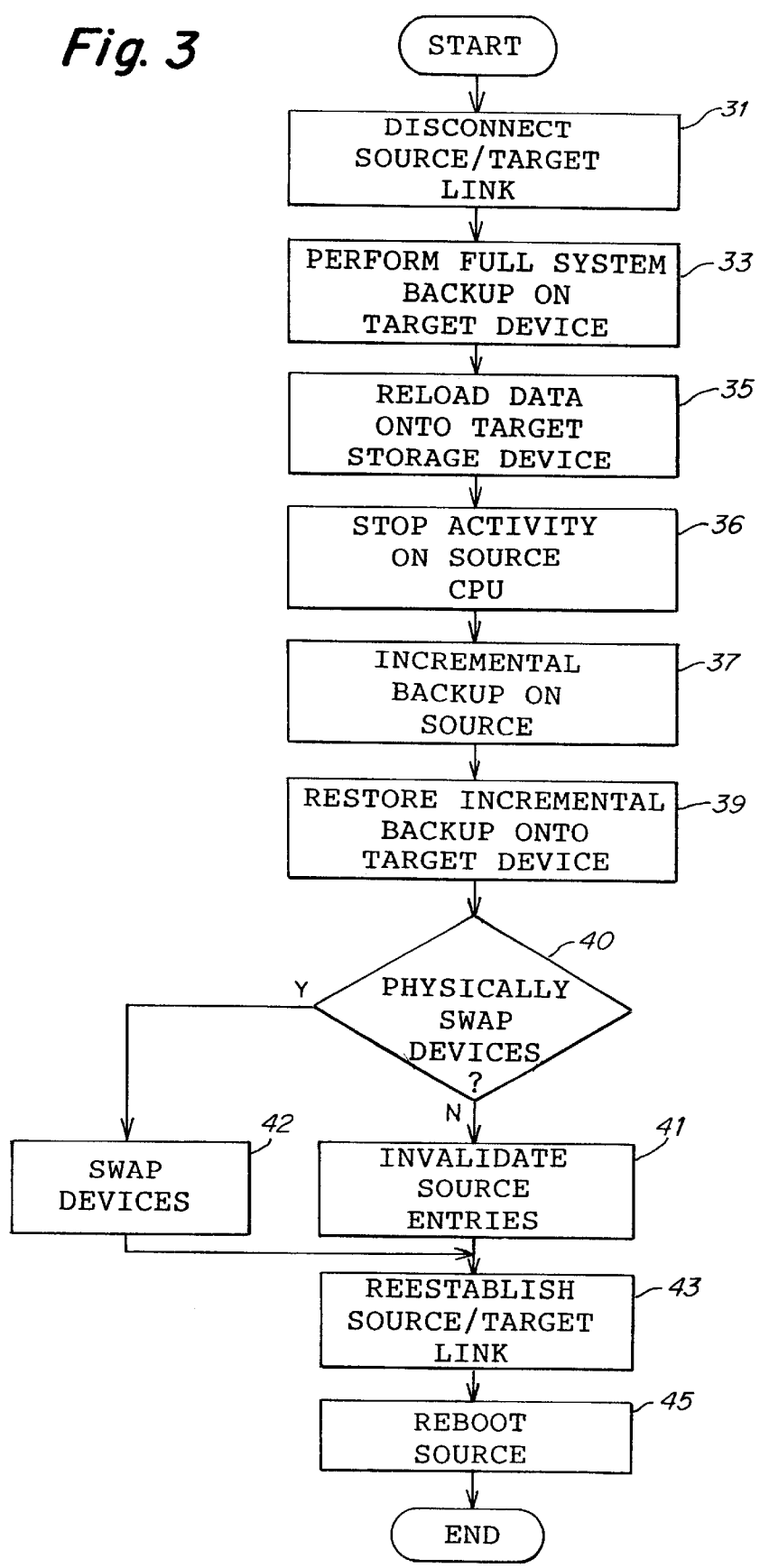
FIG. 3 is a flowchart of the steps of one illustrative embodiment of the present invention for performing data defragmentation of a source storage device in a system such as that shown in FIG. 2.

A flowchart of a process according to one illustrative embodiment of the present invention for reloading a storage device in a remote data facility is shown in FIG. 3. Initially, the link 23 (FIG. 2) between the source and target components of the system is disconnected at step 31. The source storage device 13 and its controller 15 continue to operate, along with the host CPU 11, such that normal operation of the source system components is not interrupted by the disconnection of the link. In this manner, customer applications can continue to run, and the main system components need not be devoted to performing system management operations. Prior to disconnecting the link 23, the data images on the source and target storage devices 13, 19 are synchronized to ensure that all information in the host CPU 11 has been flushed to the source storage device 13, and that all up-to-date information on the host storage device 13 has been transferred over the link 23 to the target.

After the link 23 is disconnected, a full back-up (e.g., to tape or disk) is performed, in step 33, of the mirrored information stored on the target storage device 19. The full back-up can be performed using the host CPU 21 associated with the target storage device in a manner discussed below.

Once the back-up is complete, the process proceeds to step 35, wherein the backed-up data is rewritten onto the target storage device with each logical file being written to a contiguous physical location on the storage device. This can be performed using defragmentation resources provided by the host CPU 21 (e.g., the reload software provided on the AS/400) in a manner discussed below. It should be appreciated that the present invention is not limited to use with an AS/400. Thus, the term "reload" as used herein refers generically to the writing of data from the back-up medium onto the storage devices in a format different from the backed-up format, and is not limited to the use of the AS/400 reload facilities. As discussed above, a back-up and reload of a storage device including approximately 400 gigabytes can take on the order of 18–50 hours. However, as previously stated, after the source/target link 23 is broken, the host CPU 11 on the source side continues to run customer applications, such that the back-up and reload executed on the target is transparent to the user on the source side of the system, and does not require that the source be interrupted or slowed while the target storage device is reloaded and defragmented.

Once the target storage device has been reloaded, steps are taken to identify the manner in which the source storage device has been updated since the source/target link 23 was disconnected. Initially, the time at which the source/target link was disconnected is identified. This can be accomplished in any number of ways, and the present invention is not limited to any particular implementation. For example, the source storage controller and CPU 11 may be able to identify for themselves when the link is disconnected and can store that information for later use. Alternatively, after the target is defragmented, the link 23 can be re-established and the target storage controller can pass information to the source indicating the time that the link was disconnected. As a further option, a separate connection between the source and target storage controllers (e.g., over a telephone line) can be used to pass this information from the target back to the source.

Once the defragmentation of the target is complete, the activity on the source CPU is stopped in step 36, and an incremental back-up is performed on the source component of the system in step 37. The source storage device 13 and its controller 15 maintain a log of updates for other reasons, and this log is used to generate an incremental back-up of all the updates written to the source storage device 13 subsequent to the time that the source/target link 23 was disconnected. The source CPU is brought down to perform the back-up so that additional updates do not take place during the back-up process.

Once the incremental back-up has completed, the back-up storage medium (e.g., tape or disk) is connected to the target component of the system (e.g., by being physically transported to the location of the target) and the incremental back-up information is restored onto the target source to the target. The process of incrementally backing-up the source and then restoring this information onto the target device can take approximately 2–4 hours.

After being restored with the incrementally backed-up data, the target storage device includes up-to-date data that has been reformatted and defragmented. The reason the source CPU 11 is brought down prior to the incremental back-up is to ensure that no additional updates occur to the source storage device 13, thereby ensuring that the reloaded data on the target storage device is up-to-date.

Next, steps are taken to transfer the defragmented data to the source storage device 13. This can be accomplished in several ways. First, a decision is made at step 40 as to whether the storage device with the reloaded data is to be physically swapped with the storage device directly connected to the source host CPU 11, and when it is not, the method proceeds to take steps to utilize the source/target link 23 to provide the source host CPU 11 with access to the defragmented data on the target storage device 19. In step 41, each of the entries in the source storage device 13 is invalidated, such that the host CPU 11 will not access any data directly from the source storage device 13. Thereafter, the source/target link 23 is re-established in step 43, and the source host CPU 11 is brought back on-line in step 45. Once brought back on-line, the host CPU 11 will begin attempting to access data in the main storage device 13. The invalidation of the entries in the source storage device will be recognized, and the requested data will be provided to the CPU 11 from the target storage device over the source/target link 23. As reads from the target device occur, the data will also update the corresponding entries in the source storage device 13. In addition, the source and target controllers 15 and 17 may also have a synchronization capability that actively updates the data on the storage devices until they are identical. The synchronization capability can be run in the background so that it is transparent to the user of the host and target CPUs 11 and 21. Such a synchronization capability is provided, for example, in the SYMMETRIX line of disk arrays. A technique for implementing this synchronization capability is disclosed in copending U.S. patent applications Ser. No. 08/656,035, now U.S. Pat. No. 6,092,066 and Ser. No. 08/656,036, now U.S. Pat. No. 6,092,066 which as discussed above, are incorporated herein by reference. Typically, it will take approximately 2–3 hours to synchronize storage devices each including approximately 400 gigabytes.

As should be appreciated from the foregoing, the above-described reloading technique significantly reduces the time when the normal operation of the host CPU 11 is interrupted. In particular, the host CPU 11 is only brought off-line for the time it takes to perform the incremental back-up on the source, and to restore the backed-up data to the target. Thereafter, once the source/target link 23 has been reestablished, the source CPU 11 can directly access the data from the target, without waiting for the data to be fully synchronized with the source storage device 13. Although the performance of the host CPU 11 will be slowed slightly as reads initially all come from the target storage device, the impact on performance will decrease as more and more entries in the source storage device 13 are updated with the defragmented data.

Rather than employing the source/target link 23 to provide the host CPU 11 with access to the defragmented data on the target storage device, the system can be physically reconfigured so that the physical device that served as the target storage device 19 is directly connected to the source storage controller 15 in place of the physical device that formerly served as the source storage device 13. In this manner, the reloaded storage device becomes the source storage device 13 in the system and services the source host CPU 11. This reconfiguration ensures that the source host CPU 11 has access to the updated and defragmented data. The physical swapping of the reloaded storage device is represented in the flowchart of FIG. 3 at steps 40 and 42. If it is desired to continue with the remote data facility capability of the system, the physical storage device that previously served as the source device 13 can be connected to the target storage controller 17 to serve as the target storage device 19, or a new storage device can be provided to fill this role. The entries in the new target storage device can then be invalidated and the two storage devices 13 and 19 can be synchronized in the manner described above. However, if the devices are physically swapped, some performance improvement occurs on the source side of the system because all reads can be serviced by the local storage device, without requiring access over the source/target link 23.

In the embodiment described above, the target CPU 21 is employed to conduct a back-up and reload of the target storage device 19. However, the invention is not limited in this respect. Technological advances may enable the storage device itself to execute back-up and reload operations on an internal processor, such that the separate host CPU 21 may not be necessary. The present invention is not limited with respect to what processor or other hardware is used to perform the back-up and reloading of the target storage device.

As should be appreciated from the foregoing, the present invention can be used advantageously with a source/target remote data storage facility, because the target component of the system can be employed to perform reloading without significantly interrupting operation of the source components of the system. However, the invention is not limited to use with a remote data storage facility including source and target components.

In the discussions above, the target controller 17, storage device 19 and host CPU 21 were discussed as being part of a remote data storage facility, connected to the source components of the system via a remote data link 23. However, the reloading techniques of the present invention can also be provided in connection with systems that do not have dedicated target components. In particular, as a service to customers having a main CPU and storage system similar to the source components 11, 13 and 15 of FIG. 2, a temporary link 23 can be established to an additional CPU, storage controller and storage device that would be coupled in the same manner as the target components of FIG. 2. These components could be used for the purpose of reformatting the system's main storage device, and then the temporary link 23 can be disconnected. In this respect, the distance between the main components of the system and the reloading components is irrelevant, such that the link 23 could be a remote link as discussed above, or could be a very short link with the reloading components of the system being located in close physical proximity to the main components of the system.

In this embodiment, the main system is connected temporarily to another storage device and accompanying processor that are dedicated for use in reloading and defragmenting the main storage system, and are not used during normal operation. The additional CPU and storage device (referred to herein as secondary system components) dedicated for use in reloading the main system are employed by a process shown in FIG. 4 in much the same fashion as the target components of the system are used in the defragmentation process of FIG. 3. Initially, in step 51, the secondary storage device is coupled to the main components of the system over a link that, although of potentially different physical construction, serves the same functional role in the reloading process as the source/target link 23 shown in FIG. 2. Thereafter, the main and secondary storage devices are synchronized, in step 53, using techniques described above, until the secondary storage device includes a full copy of the data on the main storage device. The link is then broken in step 55, and steps 57–63 are performed to reload and update the data on the secondary storage device, in the same manner as steps 33–39 reload and update the target storage device in the process of FIG. 3.

In step 65, a determination is made as to whether to physically replace the main storage device in the system with the secondary storage device that includes the updated and defragmented data, similar to step 40 in FIG. 3. When it is determined that the main device should be replaced, the process proceeds to step 67, wherein the replacement is made. The process then proceeds to step 69, wherein the system is rebooted and the process terminates. In this manner, the link between the secondary and main storage devices is not re-established, as the link and the secondary components of the system were employed solely to defragment the main storage device, and are not employed during normal operation.

When it is determined at step 65 that the main storage device is not to be physically replaced by the secondary storage device that includes the defragmented and updated data, the process proceeds to steps 71–75, wherein the entries in the main storage device are invalidated, the link between the main and secondary storage devices is re-established, and the main system is rebooted in the same manner as discussed above in connection with steps 41–45 of the process of FIG. 3. Thereafter, in step 77, the main and secondary storage devices are synchronized, either actively if that capability is provided in the storage devices as discussed above, or via reads being made from the CPU in the main component of the system that result in the entries in the main storage device being updated with the defragmented data. Once the main storage device is synchronized, the process proceeds to step 79, wherein the secondary storage device is removed from the system, having served its purpose of assisting in the reloading and defragmentation of the main storage device.

Figure 4:
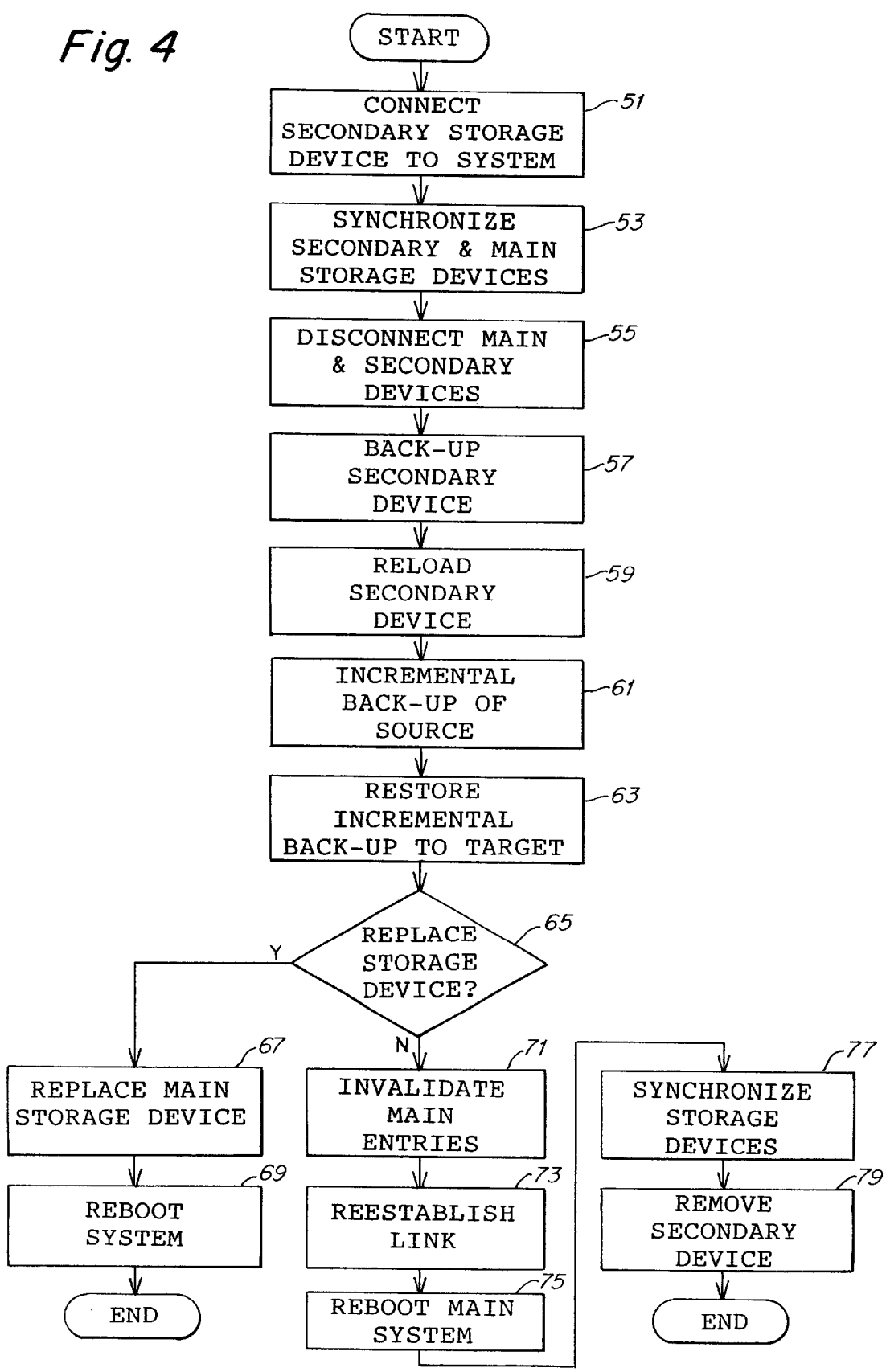
FIG. 4 is a flowchart illustrating an alternate embodiment of the invention wherein a process is provided for defragmenting a main storage device of a computer system that does not include dedicated target components.
Figure 5:
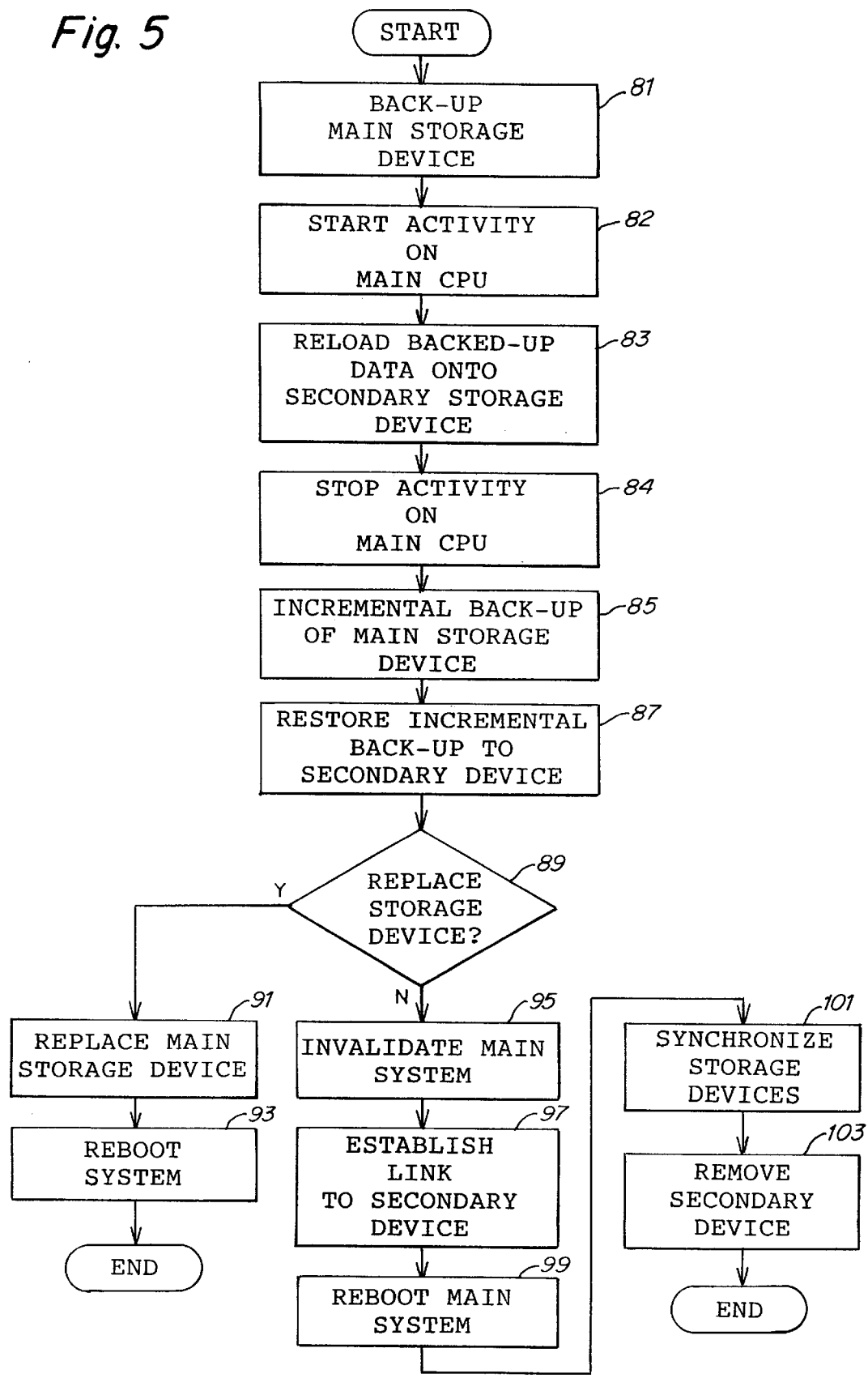
FIG. 5 is a flowchart of a further alternate embodiment of the present invention and is directed to a routine for defragmenting the main storage device of a computer system that does not include a dedicated target component.

As should be appreciated from the foregoing, the process of FIG. 4 is advantageous in that both the back-up and reload steps of the defragmentation process are performed on a secondary system, such that the operation of the main system is not affected by these operations. However, the present invention is not limited in this respect. In particular, as discussed above, the reload aspect of the defragmentation process is significantly more time consuming than the system back-up that precedes it, taking 10–30 hours versus 8–20 hours for a back-up of a storage device including approximately 400 giga-bytes. Thus, if desired, the system back-up can be performed on the main system, with the secondary system being employed primarily to perform the reload operation. FIG. 5 illustrates such a process.

In step 81, the main storage device is backed-up by bringing the system down. Once the back-up is complete, activity is restarted on the main CPU in step 82. Thereafter, in step 83, the medium on which the backed-up data is stored is coupled to the secondary storage device and a reload operation is run on the secondary system so that the data stored on the secondary storage device is defragmented. The main components of the system continue normal operation while the secondary device is reloaded. Once the reload is complete, activity on the main CPU is stopped in step 84, and an incremental back-up is performed on the main system, to include the data updated since the time that the back-up of the main system (performed in step 81) was completed. The incrementally backed-up data is then loaded onto the secondary system in step 87. At this point, the data on the secondary system has been defragmented and is up-to-date, and in steps 89–103, this data is transferred to the main system in the same manner as discussed in connection with steps 65–79 of FIG. 4.

As should be appreciated from the foregoing, the temporary use of a secondary CPU and storage device to perform reloading can be provided as a valuable service to customers of a main CPU and storage device system, because the use of the secondary components enables the customer's system to be reloaded without significant disruption to system operations.

Alternatively, if a customer has a full system including a main CPU and storage system as well as another available CPU and storage device that can serve as the secondary system in the process of FIG. 5, a service provider can utilize pre-existing resources of the customer to implement the reloading process of the present invention discussed above.

In the discussions above, a separate target storage device 19 is used to assist in reformatting information on the source storage device 13. However, the present invention can also be provided in connection with systems that do not employ a separate target storage device. In particular, when the source storage device 13 is a storage system including a plurality of storage devices (such as a storage device from the SYMMETRIX line of disk arrays that includes a plurality of disc drives), the source and target storage devices can be provided in the same storage system. For example, the SYMMETRIX line of disk arrays provide a feature known as "dual copy" or "business continuance volumes" ("DC/BCVs"). In accordance with this feature of SYMMETRIX, the storage system is configured to include one or more DC/BCV logical volumes. A DC/BCV volume can be used to establish a logical "connection" with another logical volume. The DC/BCV volume is used to make at least one additional copy or mirror of the logical volume to which it is logically connected. After the copy is made, the storage system may de-establish the connection to create a snapshot of the contents of the copied logical volume at a particular point in time. The snapshot copy can then be used to perform various operations (e.g., doing a backup and reload of the data) without disrupting or holding up access to the logical volume that was copied. Thus, a DC/BCV volume can be used as the target storage device 13 in one embodiment of the present invention.

It should be appreciated from the foregoing that the reloading process of the present invention can be used with any type of storage system and is not limited to use with disk drives. Thus, the present invention is not limited with respect to any particular type of storage device.

Furthermore, although the reformatting process has been discussed above primarily as being a reload process useful in defragmenting a storage device, the invention is not limited in this respect, and can also be used to reformat the storage device for any other purpose.

Figure 6:
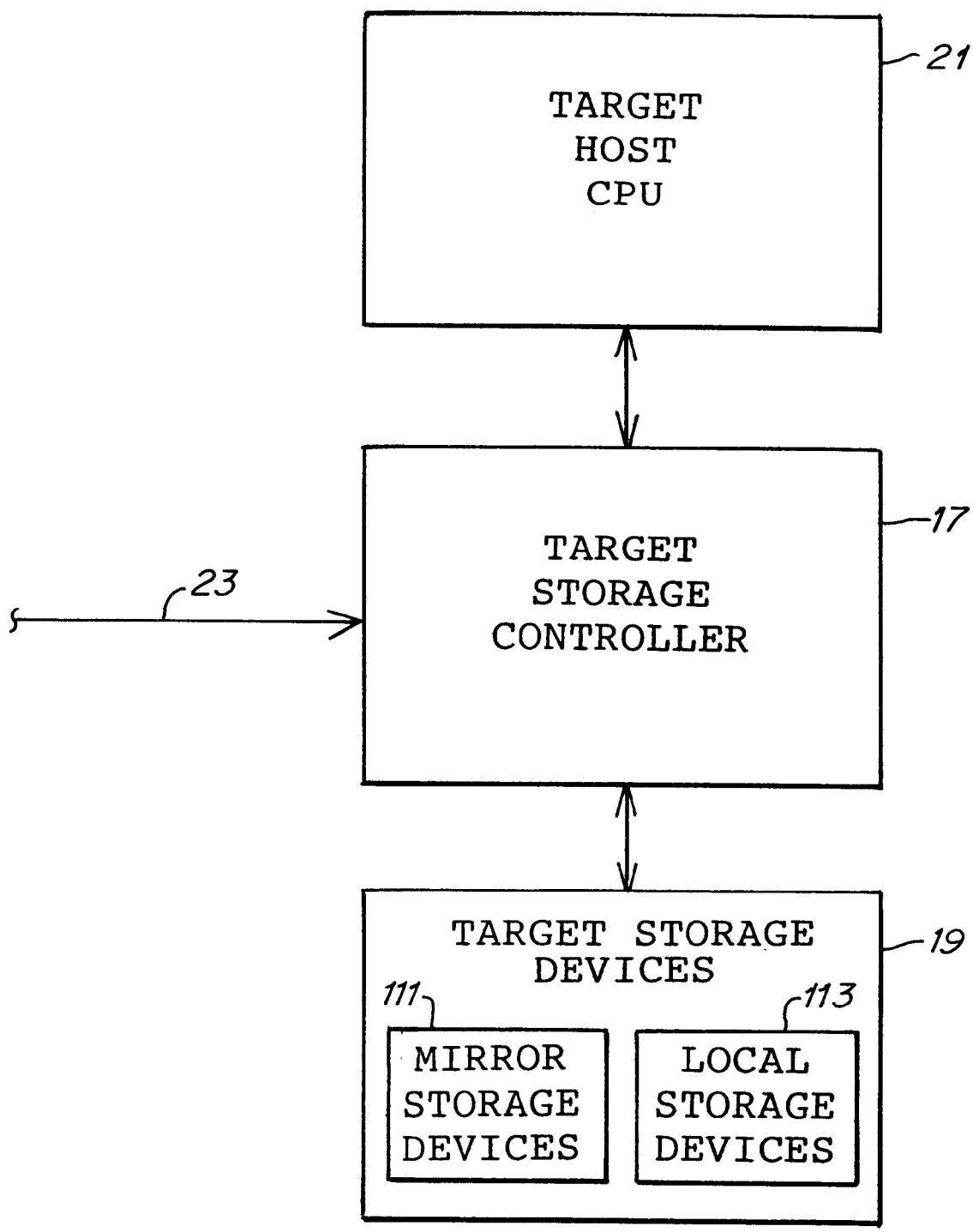
FIG. 6 is a block diagram of a target computer system on which the present invention can operate.

As discussed above, in step 33 of the process shown in FIG. 3 (and step 57 in FIG. 4), a full system back-up is performed on the target storage device 19 so that the fragmented information mirrored from the source storage device 13 is provided to a back-up medium (e.g., tape or disc). As mentioned above, the target storage device 19 may typically include a plurality of disc drives, e.g., in the SYMMETRIX line of disc arrays. When the target storage device 19 is arranged in this manner, its plurality of storage devices is typically divided into two groups as shown in FIG. 6. A first group 111 performs the function of mirroring the information stored in the source storage device 13 (FIG. 2). A second group 113 stores information used locally by the target host CPU 21.

The full system back-up of the mirrored information on target storage devices 19 in steps 33 (FIG. 3) and 57 (FIG. 4) involves a back-up of the group 111 of the target storage devices. Similarly, the reloading of the backed up information in steps 35 (FIG. 3) and 59 (FIG. 4) refers to rewriting of the information to the mirror storage devices 111. If the target host CPU 21 (or other processor on which the back-up operation is executed) can directly access the mirror storage devices 111, these back-up and reload steps can be performed in a simple and straight forward manner using resources provided by the target host CPU 21.

Some computer systems that may serve as the target host CPU 21 may not provide the user with the ability to directly access the mirror storage devices 111. For example, as mentioned above, the AS/400 operating system (OS/400) controls all access to any disc drives connected to the AS/400, such that no facility is provided to allow programmers to access the drives directly. The programmer simply refers to user data objects (e.g., files, libraries, programs, etc.) by name, and the OS/400 controls, in a manner transparent to the programmer, on which drives and at what locations the objects are stored.

Because the mirror storage devices 111 are not used by the target host CPU 21 to store information, in one embodiment of the invention these disc drives 111 are attached to the AS/400 as non-configured drives. This is the status that the OS/400 assigns to disc drives that are connected to an AS/400 but are not used by that AS/400 to store data. The source mirror storage devices 111 are attached to the AS/400 serving as the target CPU 21 as non-configured drives to prevent the OS/400 from writing data to them that could overwrite data written to the mirror storage devices 111 from the source host CPU 11. Conversely, the local storage devices 113 are used by the target host CPU 21 to store data, and are therefore attached to the OS/400 as configured drives.

Since the AS/400 provides no facility for a programmer to directly access non-configured drives, the conventional back-up facilities provided by the OS/400 cannot be employed (e.g., in step 33 of FIG. 3) to back-up the information stored on the mirror storage devices 111. For example, the back-up facility provided by the AS/400 simply enables a user to back-up data objects such as files and libraries. Since the OS/400 on the target CPU 21 (FIG. 2) did not write data objects to the mirror storage devices 111, it has no capability of finding the data objects stored thereon by the source CPU 11. Therefore, in accordance with one embodiment of the present invention, techniques have been developed for accessing the non-configured mirror storage devices 111 via the target host CPU 21. Although developed for the application described herein relating to the back-up by one AS/400 of drives written by another AS/400 (e.g., using RDF), it should be understood that this aspect of the present invention is not limited in this respect, and that it can be employed in numerous other applications to enable a programmer to directly access a non-configured drive on an AS/400.

As mentioned above, the AS/400 does not enable the user to simply request the back-up of a particular disc drive, as the OS/400 controls the management of all data objects on the disc drives, and only provides a programmer with access thereto through the use of names for the data objects. The present invention has developed novel programming methods to provide the user with access to non-configured drives (e.g., the mirror storage devices 111) on the AS/400. These programming methods are not available using the programming facilities (e.g., compilers, interfaces, etc.) that are conventionally available to AS/400 programmers. In one embodiment of the invention, these novel programming methods are used to develop a software program, referred to herein as "point in time back-up" (PTB), that enables a user to back-up (e.g., to tape) user data objects that are stored on non-configured drives attached to an AS/400. Thus, the PTB program can be executed on an AS/400 and used to back-up data objects on its non-configured drives that were written by a different AS/400. In one illustrative application, the PTB program is used to back-up the non-configured mirror storage devices 111 that contain a mirror image of the data objects stored on the source storage device 13. In this manner, a back-up is made that is equivalent to a back-up that would be made on the source CPU 11 using conventional AS/400 back-up facilities.

It should be appreciated that much of the PTB program can be written in a standard computer language (e.g., C) that can be compiled by the compilers on the AS/400 on which the PTB program will be executed (e.g., target host CPU 21). For example, when performing the back-up from one of the mirror storage devices 111, the data objects are initially read from the storage device into memory in the target host CPU 21, and are thereafter transferred to the back-up storage medium (e.g., tape). The portion of the PTB program that transfers the information from the host CPU 21 to the back-up storage medium can be generated using conventional programming techniques, such as a standard language compatible with the AS/400 compiler. Thus, only a subset of the PTB program employs novel programming methods.

Although unavailable to a user employing conventional programming techniques, the AS/400 includes machine level instructions that enable access to non-configured disc drives. These machine level instructions are typically employed by personnel servicing the AS/400, e.g., when replacing a bad disc drive the new drive may initially be attached to the AS/400 as a non-configured drive. In accordance with one embodiment of the present invention, after the PTB program is compiled, the machine code generated by the compiler is modified to include machine instructions that access the non-configured drives. Dummy statements can be inserted into the source code for the PTB program at the points where the special machine instructions are to be placed. As a result, the compiler generates unneeded commands in the machine code that can be modified to include the desired machine instructions for accessing the non-configured drives.

The AS/400 has a command entitled "Start System Service Tools" (STRSST) which has a facility called "Display/Alter/Dump" which can be used to alter the bytes in any AS/400 object, including machine language programs. In accordance with one embodiment of the invention, the STRSST command is employed to gain access to the Display/Alter/Dump facility, which is then used to edit the machine language code in the previously-compiled PTB program. The specific manner in which the machine code is modified is discussed below.

The accessing of non-configured drives is controlled in the AS/400 via a set of IBM-supplied programs that are part of the OS/400 operating system, and named "SLIC" (System Licensed Internal Code) modules. As will be appreciated by those skilled in the art, the OS/400 is a layered operating system, with the user program layer at the top. Below the user programming layer is a layer of programs that are called by the user programs and can, in turn, call the SLIC modules. The user programming level has no ability in the OS/400 to directly call a SLIC module. In addition, the IBM-supplied compilers will not generate a call to the particular SLIC modules that are capable of accessing the non-configured drives.

To call the SLIC modules that are used to access the non-configured drives (e.g., the source mirror storage devices 111), the PTB program first locates the address of the entry point of each of the desired SLIC modules. It should be appreciated that these entry point addresses can vary from machine to machine. Therefore, at run time, the PTB program determines the address of the entry point for each of the SLIC modules that is employed to access the non-configured drives.

The assembler language in the AS/400 is referred to as the MI (Machine Interface). The MI includes an instruction DIAG (short for diagnostic) that can be used to determine the entry point for each of the desired SLIC modules, or other modules discussed below. The DIAG instruction is called with a first operand that is a code number indicating the particular function desired (the code is hexadecimal 72 for locating the address of a module) and a second operand that is a structure containing (at offset hex "48") the eight-byte address of the module name and (at offset hex "80") the four-byte length of the module name. The DIAG instruction returns the eight-byte address of the entry point at hex offset "18" in the structure. This address is then stored for later use in calling the module. The DIAG instruction is described in the "Functional Reference Manual-Volume 1" for the IBM System/38 (the predecessor to the AS/400), seventh edition (1985), revision GA21-9331-7.

DIAG is one of the MI instructions that can generally only be executed within an IBM-supply program, and will not be generated by the AS/400 compiler. Thus, novel programming techniques are employed in accordance with one embodiment of the present invention to call the DIAG instruction. There is a facility in C that enables the programmer to insert particular MI instructions into a C program, so long as the inserted instructions are not of a blocked type that can be executed only within an IBM-supplied program.

To insert the DIAG instruction, the PTB program is compiled with a dummy non-blocked MI instruction that is later modified at the machine level to the DIAG instruction. For example, the non-blocked MI instruction CRTHS has a structure similar to the DIAG instruction and differs only in one byte. Thus, in one embodiment of the invention, the source code for the PTB program uses the C facility to insert the MI instruction CRTHS into the program at the location where the DIAG instruction is desired. It should be appreciated that although the instruction CRTHS is convenient to use because it is structurally similar to the DIAG instruction, the invention is not limited in this respect, and that different dummy instructions can be employed. In response to the use of the C facility to insert the MI instruction CRTHS, the C compiler generates the following six machine language instructions, with the left column illustrating the hexadecimal machine code contained in the program, and the right column showing the human-readable representation.

| | |
|---|---|
| E35E0022 | LQ 26,0X20(30),2 |
| 7B63049C | SBLRI 3,27,0,41 |
| E35E0032 | LQ 26,0X30(30),2 |
| 7B64049C | SELRI 4,27,0,41 |
| 394000FF | ADDI 10,0,255 |
| 44000141 | SCV 10 |

To modify this machine code to utilize the DIAG instruction for the PTB program, only the last byte of the fifth of the above-generated machine instructions is changed (using the STRSST facility discussed above) to:

| | |
|---|---|
| 394000D9 | ADDI 10,0,217 |

As should be appreciated from the foregoing, the DIAG instruction is executed by the PTB program multiple times, once for each of the SLIC modules discussed below that is used in accessing the non-configured drives. The DIAG routine stores the address of the entry point for each of the SLIC modules in a work space used by the PTB program so that the address can be employed when the SLIC module is called.

There are numerous ways in which each of the below-discussed SLIC modules can be called. In accordance with one illustrative embodiment of the invention, each SLIC module is called using a machine instruction that places the AS/400 into its privileged state. As will be appreciated by those skilled in the art, the AS/400 has a "problem" state in which the AS/400 operates when user programs are executing, and a "privileged" state. In the problem state, certain functions that are intended only for operating system programs on the AS/400 are prohibited or restricted, and some memory locations may not be readable or writable. Conversely, in the privileged state, all functions may be executed and access is provided to some memory locations that are unavailable in the problem state. In accordance with one embodiment of the present invention, the PTB program makes use of several functions that are only available in the privileged state. Therefore, in accordance with this embodiment of the present invention, prior to executing those functions, the PTB program places the AS/400 into the privileged state. In accordance with one embodiment of the invention, the privileged state is entered by a machine instruction that calls the below-discussed SLIC modules. However, the present invention is not limited in this respect, as the privileged state can be entered in other ways.

In one embodiment of the invention, the SLIC modules are called by the SCV 10 (System Call Vectored) machine instruction, which places the AS/400 into the privileged state. As will be appreciated by those skilled in the art, the AS/400 includes a Power PC processor that includes multiple SCV machine instructions. The SCV 10 instruction employed in one embodiment of the PTB program is so named because the particular function to be executed by the SCV 10 instruction is specified by a value loaded by the calling program into machine register 10. The value stored in machine register 10 is used to index into a table that stores the address of the program to be called. The OS/400 includes a number of entries in the SCV 10 table, but the below-discussed SLIC modules employed in reading the non-configured drives are not normally among them. However, there are a number of unused locations in the table SCV 10 table. In accordance with one embodiment of the present invention, the PTB program, at run time, finds an unused entry in the SCV 10 table that is used to stored information used in calling the desired SLIC modules.

To find an empty entry in the SCV 10 table, the PTB program reads locations in the AS/400 main memory that are not conventionally accessible to a programmer using IBM-provided facilities. Thus, novel programming techniques are again employed to read the relevant locations in the AS/400 main memory. The SCV 10 table is a module in the AS/400 named #cfmitab. To determine the address for the SCV 10 table, the DIAG instruction is used in the manner discussed above to find the address of the corresponding module.

The SCV 10 table is not accessible (i.e., readable or accessible) to a user employing conventional programming techniques, e.g., the table is not accessible using C statements in the PTB program. However, the AS/400 includes machine level instructions that enable the SCV 10 table to be read and written. Thus, in accordance with one embodiment of the present invention, after the PTB program is compiled, the machine code generated by the compiler is modified to include machine instructions that enable the SCV 10 program to be read and written.

To read or write the SCV 10 table, the PTB program contains the following C code:

```
int      len;
char     vaddr[8];
char     *pdatap;
``` memcpy(pdatap, vaddr, len).

The compiler generates the following machine code for the memcpy statement.

| | |
|---|---|
| EB9FFFA6 | LWA 28,0XFFA4(31) |
| E2DE0042 | LQ 22,0X40(30),2 |
| 7AFC049C | SELRI 28,23,0,41 |
| 63950000 | ORI 21,28,0 |
| EA9FFFA6 | LWA 20,0XFFA4(31) |
| 7A980020 | RLDICL 24,20,0,32 |
| 3B3FFFB0 | ADDI 25,31,−80 |
| 7F3BE378 | OR 27,25,28 |
| 7B7B0721 | RLDICL. 27,27,0,60 |
| 40820064 | BC 4,2,0X64 |
| 633A0000 | ORI 26,25,0 |
| 63970000 | ORI 23,28,0 |
| 7B16E103 | RLDICL. 22,24,60,4 |
| 3AA00000 | ADDI 21,0,0 |
| 41820038 | BC 12,2,0X38 |
| 36D6FFFF | ADDIC. 22,22,−1 |
| E259000F | LQ 18,0X0(25),15 |
| FA5C0002 | STQ 18,0X0(28) |
| 3AA00010 | ADDI 21,0,16 |
| 41820024 | BC 12,2,0X24 |
| 7EC903A6 | MTSPR 9,22 |
| E25A001F | LQ 18,0X10(26),15 |
| 335A0010 | ADDIC 26,26,16 |
| 781AD19A | SELIR 26,0,26,35 |
| FA570012 | STQ 18,0X10(23) |
| 32F70010 | ADDIC 23,23,16 |
| 7817B99A | SELIR 23,0,23,35 |
| 4200FFE8 | BC 16,0,0XFFE8 |
| 7B140721 | RLDICL. 20,24,0,60 |
| 41820010 | BC 12,2,0X10 |
| 7E8103A6 | MTSPR 1,20 |
| 7E5AAC6A | LSDX 18,26,21 |
| 7E57AD6A | STSDX 18,23,21 |
| 48000014 | B 0X14 |
| 63830000 | ORI 3,28,0 |
| 63240000 | ORI 4,25,0 |
| 63050000 | ORI 5,24,0 |
| 4B800C03 | BLA 0X3800C00 |

The seventh instruction from the top is changed (using STRSST as discussed above) to:

| | |
|---|---|
| EB3FFFB0 | LD 25,0XFFB0(31) |

The variable "vaddr" contains the virtual address of the memory location to be copied, and "pdatap" points to the location that the information is to be copied to. As written and compiled, the C code only copies the address of the variable "vaddr" to the location specified by "pdatap". As modified, however, it copies the data pointed to by the variable "vaddr" (i.e., the virtual address to be copied). While the original machine instruction loads the address of the variable "vaddr" into register 25, the modified instruction loads the address contained in the variable "vaddr" into register 25. Register 25 is then used to address the data to be copied.

Empty entries in the SCV 10 table have data that is all 0's. Thus, to find an empty entry in the table, the PTB program simply reads through the table in the manner discussed above until an empty entry is discovered. At that point, the PTB program loads (again in the manner discussed above) into the empty entry information that can be used to call the desired SLIC module.

It should be appreciated from the foregoing that for each SLIC module to be called by the PTB program, its entry point could be stored in a different SCV 10 table entry so that each SLIC module could be called directly upon access of its corresponding entry in the SCV 10 table. However, this would require that a separate entry in the SCV 10 table be provided for each SLIC module. As discussed below, there are multiple (e.g., six in the particular embodiment discussed below) SLIC modules accessed by the PTB program. In one embodiment of the invention, it is preferred to minimize the number of entries that the PTB program adds to the SCV 10 table. Therefore, in accordance with this embodiment, only a single entry is added to the SCV 10 table for use in calling all of the desired SLIC modules used by the PTB program. The information stored in the single entry in the SCV 10 table in turn calls a routine in the PTB program that passes back the address of the relevant SLIC module to be called by the SCV 10 machine instruction.

The PTB program includes multiple unique routines, one specific to each of the SLIC modules to be called, as well as a generic routine that is invoked when any one of the SLIC modules is called and identifies the entry point for the particular SLIC module being called. Each of the SLIC module-specific routines in the PTB program is written in C and can be compiled by the IBM-supplied compiler. Each builds its own parameter structure that defines the address of the entry point for its specific SLIC module. The specific routine for each of the SLIC modules is executed in the PTB program before calling the SCV 10 machine instruction to invoke that SLIC module. Furthermore, before the PTB program proceeds to the SCV 10 instruction, the specific entry point generation routines puts the address for its parameter structure into a particular machine register (e.g., machine register 3). The generic routine in the PTB program is called via the entry in the SCV 10 table. The generic routine uses the parameter structure specified in register 3 to identify the entry point for the SLIC module, and to determine the relevant information that should be passed to the SLIC module as it is called.

Although most typically only one PTB job will be executing on the host CPU (e.g., the target CPU 21 in FIG. 6), in one illustrative embodiment of the invention the capability is provided to execute multiple concurrent jobs on the host simultaneously. The PTB program preferably removes the entry added to the SCV 10 table after it has completed execution. However, if multiple PTB jobs are executed concurrently, they may both be using the same entry in the SCV 10 table. In this respect, in addition to searching for an empty entry in the SCV 10 table as discussed above, the PTB program can also search for an entry that points to the routine in the PTB program that is used generically to call each of the SLIC modules. If this address is already in the SCV 10 table because it was added by an earlier PTB job, the later PTB job will simply reuse the entry. To prevent an earlier-terminating PTB job from removing the SCV 10 table entry when it is in use by other PTB jobs, a locking protocol can be employed. It should be appreciated that the locking protocol can be implemented in many different ways. In one embodiment of the invention, each PTB job that uses the SCV 10 table entry places a lock on the PTB program. The lock does not prevent other PTB jobs from using the SCV 10 table entry, but prevents any of the jobs from removing the entry from the table. Thus, the entry used by the PTB program will only be removed by a PTB job that completes its execution and sees no other locks on the PTB program, indicating that there are no other PTB jobs currently running that need access to the SCV 10 table.

As discussed above, the SLIC modules used by the PTB program to access the non-configured drives (e.g., the mirror storage devices 111 in FIG. 2) are called by executing the SVC 10 machine instruction. The particular SLIC modules called, as well as the sequence in which they are called by the PTB program, will now be discussed in connection with FIG. 7, which is a flowchart showing the steps executed by the PTB program to read information from a disc drive.

As will be appreciated by those skilled in the art, the AS/400 stores data on a disc drive in pages that include a header (sixty-four bits) having certain information relating to the page of data (e.g., indicating how many contiguous pages are stored on a disc), as well as the data in the page. As will be discussed further below, the SLIC module called by the PTB program (in step 123) that actually performs the read of information from a non-configured drive places the information read in two buffers in the main memory of the AS/400 (e.g., target CPU 21). A page header buffer stores the header in a first page of main memory, and a page data buffer stores all of the other information in the page in a second page in main memory. Thus, before executing the read of a page of data from the disc drive, the PTB program first calls a SLIC module to allocate the pages of main memory in the AS/400 that will store the page data buffer and the page header buffer. To allocate the two pages of memory in the AS/400, the module "RealPage" is called twice, in step 115, to allocate the two pages of memory. The module RealPage has a number of different entry points that do different things. The relevant entry point called by the PTB program is as follows:

".allocate__RealPageFU1Q2__8RealPage15SmPageWaitYesNoQ2__ 8RealPage 15SmZeroPageYesNo".

When the module RealPage is called, it is passed parameters in the following machine registers:

register 3 —the number of pages to allocate (one in the example above)

register 4—0;

register 5—0.

Although the significance is not fully understood by Applicant, 0's are loaded into registers 4 and 5 because the IBM-supplied programs that call this module at the above-referenced entry point first load 0's into those registers. When called at the above-referenced entry point, the module RealPage allocates a page (4K bytes) and returns in register 3 the address of the allocated page in the main memory of the AS/400. In between the two calls to this module in step 115, the address returned in register 3 is stored elsewhere so as to not be overwritten.

As will be discussed below in connection with step 123, the SLIC module (named "SmDasdPage") that actually performs the read is passed a parameter structure that includes information as to which disc drive to read, the address of the relevant page on the disc drive, and the address of the two pages in the main memory of the AS/400 that were allocated for this page in step 115. In step 117, module "New" is called at entry point "._nw__FU1" to allocate space in the main memory of the AS/400 to store the parameter structure that will be passed to the SLIC module called in step 123. In calling the module New, a parameter is passed to the module in register 3 to specify the size of the memory to allocate (e.g., 720 bytes).

As discussed below in connection with step 123, the OS/400 maintains a table having an entry corresponding to each of the non-configured disc drives. When called, the module SmDasdPage that reads data from one of the non-configured disc drives is passed the address of the entry in this table to identify the specific drive to be read. In step 119, the PTB program finds the address of the entry in the table of non-configured drives that corresponds to the specific drive to be read. The PTB program locates the entry by reading a chain of addresses in the AS/400 main memory that are not accessible using standard IBM-provided facilities. Thus, in accordance with one illustrative embodiment of the invention, programming techniques are employed to access locations in the AS/400 main memory that are not accessible using standard IBM-provided facilities.

To read memory, the PTB program calls the SLIC module "stringEAOHighUse" at entry point ".memcpyeao" and passes to the module the following parameters:

register 3 —address where the copied data is to be placed;

register 4 —address to be read from;

register 5 —length (in bytes) of information to be copied.

When the AS/400 main memory is to be written at a location not generally accessible, the SLIC module "stringEAOHighUse" can be called at the same entry point, simply reversing the destination and source addresses provided in registers 3 and 4.

As mentioned above, the PTB program locates the entry for a specific drive in the table of non-configured disc drives by reading a chain of addresses in the AS/400 main memory that are not accessible using standard IBM-provided facilities. First, the node address communication area (NACA) is at fixed memory address hex "8000000000 004000". At offset hex "30" in the NACA is the address of the Storage Management Control Block (SMCB). At offset hex "48" in the SMCB is the address of a table, labeled here as "TableC". At offset hex "820" in TableC is the address of a table labeled here as "TableD". At offset hex "130" in TableD is the address of the table of non-configured disc drives. Finally, the offset into the non-configured table of the entry for the specific drive is calculated as thirty-two times the number of the drive.

In step 121, the PTB program places data into the SmDasdPage parameter structure allocated in step 117 prior to executing the read of the disc drive in step 123. This is done by calling the module "SmDasdPage" at the following entry point:

"._ct_
  10SmDasdPageFP13SmLogicalDasdU18DasdAreaUtPvT517
  DasdErrorRecovery 13MirrorSubUnitT2Q_
  13SmLogicalDasd19AdditionalErpAction".

Parameters are passed to the SmDasdPage module in the following registers:

register 3—address of the SmDasdPage structure allocated in step 117;

register 4—address of drive table entry found in step 119;

register 5—number of pages to be read from the disc drive;

register 6—0 register 7—page number of the first page to be read;

register 8—address of the header buffer allocated in step 115;

register 9—address of the data buffer allocated in step 115;

register 10—30.

The values "0" and "30" are loaded respectively into registers 6 and 10 because the IBM-supplied programs that utilize this module at the above-referenced entry point do so. As discussed above, only a single page of memory is allocated, in step 115, for the information to be read, so that the number "1" is loaded into register 5. Calling the module SmDasdPage at the above-referenced entry point causes the SmDasdPage parameter structure that will be used in step 123 to be built.

After the SmDasdPage parameter structure has been built, the PTB program proceeds to step 123, wherein the SLIC module SmDasdPage is called at entry point ".readDiag_10SmDasdPageFv". Parameters are passed to the SmDasdPage module in the following registers:

register 3 —address of the SmDasdPage structure allocated in step 117.

Calling the SmDasdPage module at this entry point causes the disk drive identified in the parameter structure built in step 121 to be read beginning at the page number specified in the parameter structure. The number of pages read is also specified by the parameter structure. The information read is stored in the pages of main memory in the AS/400 allocated in step 115.

In step 125, the PTB program copies the data and header blocks read in step 123 from the buffers that were allocated in the main memory of the AS/400 in step 115 to internal storage for the PTB program, e.g., these blocks are copied to variables accessible to the C program.

Finally, the PTB program, in step 127, calls the SLIC module SmDasdPage at entry point "._dt₁₃10SmDasdPageFv". This entry point is called to clean up the program by deleting the buffers allocated in step 115 and the SmDasdPage parameter structure built in step 121. Parameters are passed in the following registers:

register 3—address of the SmDasdPage structure allocated in step 117;

register 4—3 (because the IBM-supplied programs do so).

Figure 7:
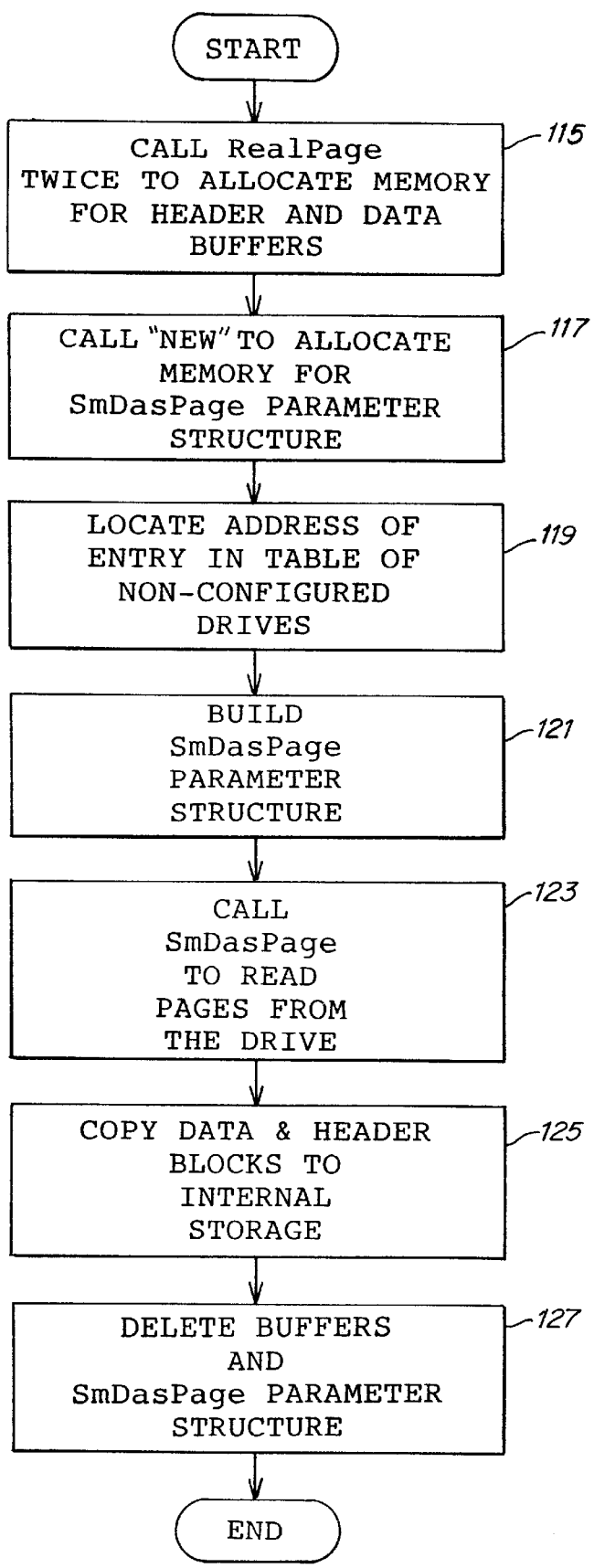
FIG. 7 is a flowchart of the steps of one illustrative embodiment of the invention for reading information from a non-configured drive on an AS/400.

The routine shown in FIG. 7 illustrates the manner in which the PTB program reads a page of data from a non-configured disc drive in accordance with one illustrative embodiment of the present invention. For the application wherein a back-up operation is performed on the non-configured disc drive, it should be appreciated that such back-ups are typically performed on user objects (e.g., a file, program, etc.). The PTB program of the present invention can be employed to back-up either a single object, such as a file, or all of the objects in a specified library. As discussed above, when the PTB program is executed on an AS/400 that did not write the user objects to the non-configured disc, the user objects cannot be found using conventional programming techniques. Thus, in accordance with one illustrative embodiment of the invention, novel programming techniques have been developed to locate user objects on a non-configured disc drive.

The OS/400 uses machine indices to record the addresses of objects on a disc drive. Each machine index stores data with a corresponding key value that can be used to look up the data. For example, customer files may be indexed by a customer number, with the unique customer number assigned to a given customer acting as the key, and the file stored at that key address including the data corresponding to the customer. The OS/400 maintains three machine indices that are used by the PTB program to determine the location of user objects on the non-configured disc drives. First, a "Permanent Directory" is kept by the OS/400 and is keyed by virtual address. The information stored in the directory provides the physical disc address at which a block of an object having the given virtual address is stored. Second, a "machine context" is an index that is keyed by object type and name. This index stores the virtual address of the named objects. Finally, the AS/400 includes a separate context for each library, keyed by object type and name, that each includes a list of the objects (e.g., files) in the library, as well as the virtual address of the objects in the library.

The physical location for any object on a non-configured disc drive can be found using the above-described indices in the following manner. The PTB program is provided with the name of the library and the object. The name of the library is first used to index into the machine context, which provides the virtual address of the library. The library virtual address is then used to locate the library context, and the object name is used to index into the library context, which then provides the virtual address for the object. This virtual address is then used to index into the permanent directory, which provides the physical address for the object on the non-configured disc drives.

It should be appreciated that the permanent directory, machine context and library context are stored on the non-configured drives themselves, and therefore, are not accessible to the PTB program using the index handling routines provided on the AS/400 (recalling that the AS/400 on which the PTB program is executed is not the one that wrote the information to the non-configured drives). Although it would be possible to access the three above-described directories using the special programming techniques discussed above, in one illustrative embodiment of the invention, these indices are copied to configured discs so that the PTB program can take advantage of the index-handling programs on the AS/400.

The only way that the AS/400 provides to build an index using normal functions is to create an empty index, and then add entries to it one-by-one. This would be a particularly difficult process using the above-discussed programming techniques to access the non-configured drives, because the format of each of the indices would have to be maintained. Thus, in one embodiment of the invention, the PTB program builds indices from user space objects. Initially, the PTB program creates enough user space objects to equal the size of the index. User space objects are limited to sixteen megabytes, whereas indices can include up to four gigabytes. The PTB program copies each block of each index from the non-configured disc to a user space object, and then links the user space objects together by inserting into each user space object a pointer to the next user space object in the same manner that the blocks of the indices are linked. Finally, the PTB program modifies the header of the first user space object to convert it into a user index object, and inserts the user index into a library (it should be appreciated that all objects in the AS/400 need to be stored in a library). Thus, the newly created index is made accessible to the AS/400 index-handling programs.

To utilize each of the machine indices, the PTB program calls the SLIC module "IxPLMPInterfacesHighUse" at entry point ".ixcbroute", which is the entry point to the index handling routines. The only parameter passed to this SLIC module is provided in register 3, and is the address of a structure (e.g., a C variable) that is built by the PTB program and includes the information in the following format expected by the SLIC module. At hex offset "4" in the structure is the two-byte length (in bytes) of the argument that is provided as the key to the index. For example, when accessing the Permanent Directory, the length is seven to indicate that the argument passed as the key to the index (i.e., a virtual address) includes seven bytes. At hex offset "8" is the length of the result area which is a variable in the C program that is large enough to hold the result (e.g., 128 bytes). At hex offset "20" is an eight-byte field that is the address of the variable that includes the argument that is the key to the index. At hex offset "28" is the eight-byte address of the variable in the C program in which the result returned by the index will be placed. Finally, at hex offset "30" is the eight-byte address of the machine index being accessed. This is the address of the machine index within the user space object that was created by the PTB program when the machine index was copied onto the configured drives.

Figure 8:
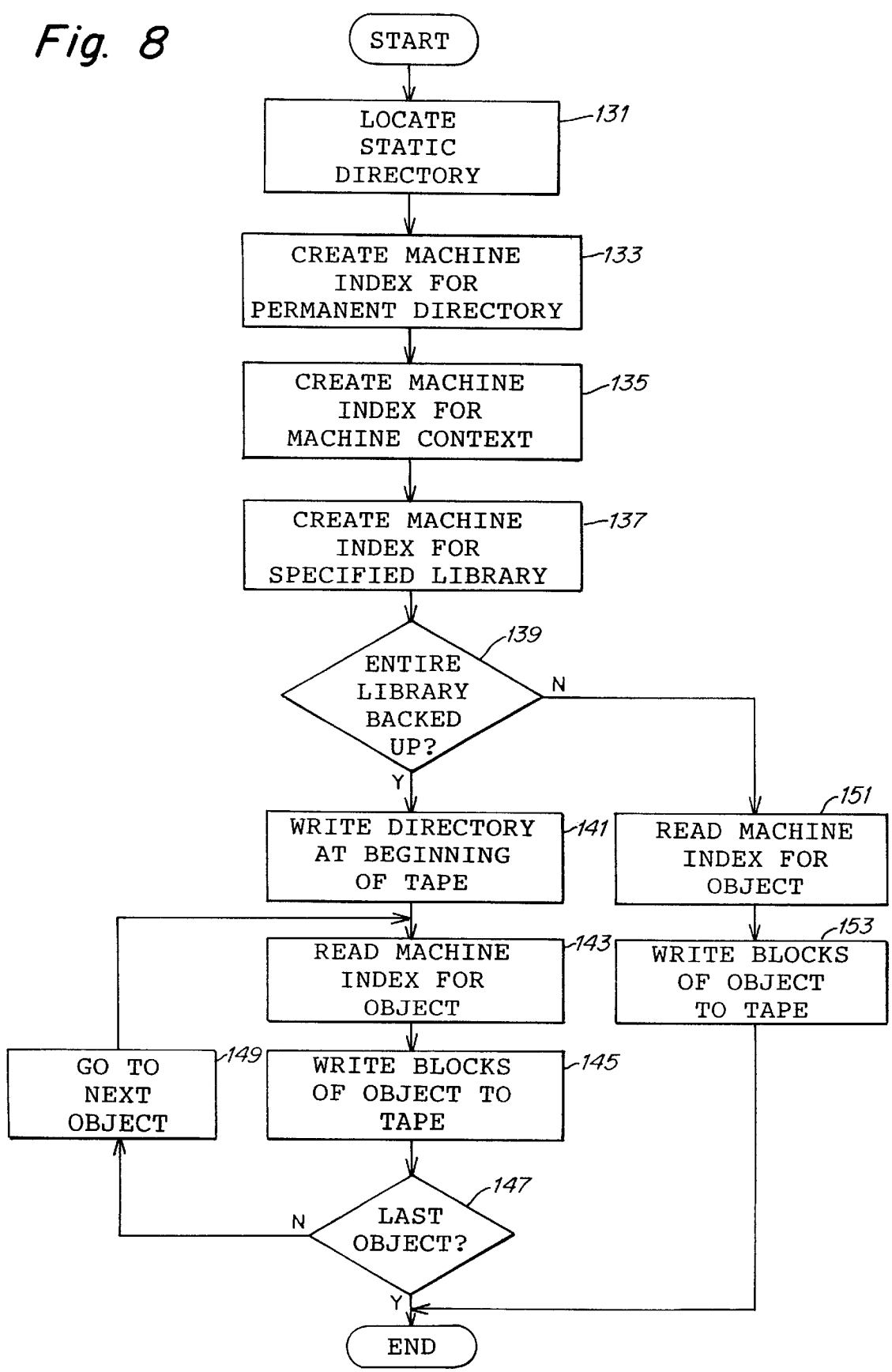
FIG. 8 is a flow chart of the steps of one illustrative embodiment of the invention for performing a back-up of a non-configured drive on an AS/400.

FIG. 8 illustrates a flowchart of the steps performed by the PTB program. The first four initial steps (i.e., steps 131–137) relate to the creation of the machine indices on the configured drive. To begin this process, the address of the permanent directory is determined. This directory can be located in different places in memory on different machines. However, the AS/400 provides a static directory that is always fixed and includes the disc addresses of the blocks that comprise the permanent directory. Thus, in step 131 the PTB program initially locates the static directory, which is always located on non-configured drive 1, at fixed disk page number "4328". Next, in step 133, the PTB program creates a machine index on the configured drives for the permanent directory. The blocks that comprises the permanent directory are located using the disc addresses specified in the static directory. The permanent directory is comprised as a plurality of blocks, each of which has an address specified in the static directory. Therefore, by examining the static directory, the PTB program can determine how many blocks are included in the permanent directory. The machine index for the permanent directory is created in the manner described above.

In step 135, a machine index is created on the configured drives for the machine context. The machine context is stored at a fixed virtual address (i.e., address "000000000D 000000"), and the permanent directory includes information identifying how many blocks of information are stored in the machine context. At step 137, a machine index is also created for the specified library that is being backed-up. The permanent directory includes information identifying how many blocks are stored in each library. The virtual address for the library is stored in the machine context, and the number of blocks stored therein is specified in the permanent directory.

Once the machine indices have been created in steps 131–137, the PTB program proceeds to step 139, wherein a determination is made as to whether the entire library is to be backed up, and when it is, the program proceeds to step 141, wherein a directory is written at the beginning of the back-up tape listing all of the objects in the library and their sizes. This information is written at the beginning of the tape simply to follow the conventional AS/400 back-up protocol, in which when multiple objects are backed up on a tape, the tape begins with a directory including information concerning those objects. After writing the directory, the program proceeds to step 143, wherein the machine indices are accessed in the manner discussed above to locate the physical address of the object on the non-configured disc. The method then proceeds to step 145, wherein the blocks of the object are written to the tape. It should be appreciated that the transfer of the information to the tape is a two-step process. Initially, the blocks of the object are read from the non-configured disc, and stored in memory in the host AS/400. The information is then transferred from the AS/400 to the tape drive. The PTB program next proceeds to step 147, wherein a determination is made as to whether the last object in the library has been backed up, and when it has not, the method proceeds to step 149, wherein it goes to the next object, and then returns to step 143. Thus, through the execution of steps 143–149, the PTB program iterates through all of the objects in the library, until a determination is made at step 147 that the last object has been backed up, at which point the program terminates.

When it is determined at step 139 that the entire library is not to be backed up, the program proceeds to step 151, wherein the machine index for the sole object to be backed up is read, and then to step 153, wherein the blocks of that object are written to tape. The program then terminates.

As discussed above in connection with steps 35, 59 and 83 of FIGS. 3, 4 and 5 respectively, in the embodiment of the invention wherein a secondary CPU (e.g., target CPU 21 in FIG. 2) is used to reformat the data on a main storage device (e.g., source storage device 13 in FIG. 2), the reformatted data is initially reloaded back onto a secondary storage device (e.g., target storage device 19 in FIG. 2). When the mirroring drives are arranged as non-configured drives on an AS/400 that serves as the secondary CPU, the reload can be done using novel programming techniques similar to those described above for performing the back-up. However, in one embodiment of the invention, the secondary system is re-configured to enable the reload to be performed using the conventional reload resources provided on the AS/400 that serves as the secondary CPU (e.g., the target CPU 21 in FIG. 2).

In one embodiment of the invention, after the incremental back-up is complete and all of the information to be reloaded onto the secondary storage device has been backed-up, the secondary system (e.g., target CPU 21) is re-configured such that the mirroring drives 111 (FIG. 6) are arranged as configured drives. Thus, the information on the back-up medium (e.g., tape) can be reloaded onto the mirroring storage devices 111 in a defragmented state using the conventional reload facilities provided on the AS/400. It should be appreciated that the conventional reload facilities enable information to be loaded from the back-up medium even when the data objects (e.g., libraries and files) stored thereon were not written by the host CPU (e.g., target CPU 21) that is performing the reload operation. Furthermore, because the data objects on the back-up medium were initially created by the source CPU 11, those data objects are readable by the source CPU when the link 23 is re-established as discussed above. Thus, although the defragmented data is reloaded onto the mirror storage devices 111 by the target CPU 21, that information is readable by the source CPU 11.

After the data is reloaded onto the mirror storage devices 111, and before the link with the source CPU 11 is re-established, writes to the mirroring storage devices 111 that store the defragmented data are inhibited so that the defragmented data will not be overwritten by the target CPU 21. This can be done in a number of ways, either in the target CPU or the target storage controller 17. For example, the target CPU 21 can simply be brought down so that it will not write to the mirror storage devices 111. Alternatively, the storage controller 17 may have the capability of inhibiting all further writes to those devices 111 from the target CPU 21. Finally, if it is desired to have other operations of the target CPU 21 continue after the re-establishment of the link 23, the AS/400 of the target CPU 21 can be re-configured to again arrange the mirroring storage devices 111 as non-configured drives so that they will not be overwritten by the target CPU 21, prior to enabling other operations on the target CPU 21.

It should be understood that various changes and modification of the embodiments shown in the drawings and described in the specification may be made within the scope of the invention. It is intended that all matter contained in the above-description and shown in the accompanying drawings be interpreted in an illustrative and not in a limiting sense. The invention is only limited as defined in the following claims and their equivalence thereto.

What is claimed is:

1. A method of reformatting data stored on a source storage device in a system that includes the source storage device, a source processor coupled to the source storage device, and a target storage device coupled to the source storage device, the source storage device storing data in an initial format, the target storage device including a copy of the data stored on the source storage device, the method comprising the steps of:
   (A) transferring the data in the initial format from the target storage device onto a temporary storage medium;
   (B) reloading the data from the temporary storage medium onto the target storage device in a reformatted format; and
   (C) transferring the reformatted data from the target storage device to the source storage device.

2. The method of claim 1, wherein the data is fragmented in the initial format, and wherein step (B) includes a step of reloading the data onto the secondary storage device such that the data is defragmented in the reformatted format.

3. The method of claim 1, wherein the source storage device is a disk drive system including at least one disk drive.

4. The method of claim 1, wherein step (C) includes a step of performing normal operations on the main processor while transferring the reformatted data from the target storage device to the source device.

5. The method of claim 1, wherein step (B) includes a step of performing normal operations on the source processor while reloading the data onto the target storage device.

6. The method of claim 5, wherein step (A) includes a step of performing normal operations on the source processor while transferring the data in the initial format from the target storage device onto the temporary storage medium.

7. The method of claim 1, further including a step of physically replacing the source storage device with the target storage device so that the target storage device is coupled to the source processor in place of the source storage device, thereby making the reformatted data on the target processor accessible to the main processor.

8. The method of claim 7, further including a step of physically replacing the target storage device with the source storage device so that the source storage device is coupled to the target processor in place of the target storage device.

9. The method of claim 1, wherein the system further includes a secondary processor coupled to the target storage device, and wherein step (B) includes steps of:
   coupling the temporary storage medium to the secondary processor; and
   executing a reload operation on the secondary processor to reload the data from the temporary storage medium onto the target storage device.

10. The method of claim 9, wherein step (A) includes steps of:
   coupling the temporary storage medium to the secondary processor; and
   executing a backup operation on the secondary processor to transfer the data from the target storage device to the temporary storage medium.

11. The method of claim 10, wherein the source processor is a source AS/400 and the secondary processor is a secondary AS/400, and wherein step (A) includes a step of executing a backup operation on the secondary AS/400 to transfer the data from the target storage device to the temporary storage medium.

12. The method of claim 1, wherein the system further includes a link between the source storage device and the target storage device, and wherein the method further includes a step of, before executing any of steps (A) through (C), disconnecting the link between the source and target storage devices.

13. The method of claim 12, further including a step of continuing normal operations on the source processor after the link between the source and target storage devices is disconnected.

14. The method of claim 12, wherein step (C) further includes steps of:
   re-establishing the link between the source and target storage devices; and
   transferring the reformatted data across the link.

15. The method of claim 14, wherein step (C) further includes a step of invalidating each entry in the source storage device prior to re-establishing the link.

16. The method of claim 12, further including, prior to step (C), steps of:
    determining all data updates that occur to the source storage device between a time at which the link is disconnected and completion of the reloading of the data in step (B); and
    transferring the data updates to the target storage device.

17. The method of claim 16, wherein the step of transferring the data updates to the target storage device includes steps of:
    coupling a temporary storage medium to the source processor;
    performing an incremental back-up operation on the source processor to back-up the data updates on the source storage device onto the temporary storage medium; and
    transferring the data updates from the temporary storage medium to the target storage device.

18. The method of claim 16, wherein step (C) further includes steps of:
    re-establishing the link between the source and target storage devices; and
    transferring the reformatted data across the link.

19. The method of claim 18, wherein step (C) further includes a step of invalidating each entry in the source storage device prior to re-establishing the link.

20. The method of claim 16, further including a step of, prior to the step of determining all data updates, stopping normal activity on the source processor to prevent additional data updates to the source storage device.

21. The method of claim 20, wherein step (C) further includes steps of:
    re-establishing the link between the source and target storage devices; and
    transferring the reformatted data across the link.

22. The method of claim 21, wherein step (C) further includes a step of invalidating each entry in the source storage device prior to re-establishing the link.

23. The method of claim 21, further including a step of resuming normal operations on the source processor prior to step (C).

24. A method of reformatting data accessible to a main processor from an initial format to a reformatted format, the data in the initial format being stored in a main storage device coupled to the main processor, the method comprising the steps of:
    (A) transferring the data in the initial format from the main storage device onto a temporary storage medium;
    (B) reloading the data from the temporary storage medium onto a secondary storage device in the reformatted format; and
    (C) coupling the secondary storage device to the main processor so that the reformatted data on the secondary storage device is accessible to the main processor.

25. The method of claim 24, wherein step (C) includes a step of physically replacing the main storage device with the secondary storage device so that the secondary storage device is coupled to the main processor in place of the main storage device, thereby making the reformatted data on the secondary processor accessible to the main processor.

26. The method of claim 24, wherein the data is fragmented in the initial format, and wherein step (B) includes a step of reloading the data onto the secondary storage device such that the data is fragmented in the reformatted format.

27. The method of claim 24, wherein the source storage device is a disk drive system including at least one disk drive.

28. The method of claim 24, wherein step (C) includes a step of transferring the reformatted data from the secondary storage device to the main storage device so that the main processor can access the reformatted data from the main storage device.

29. The method of claim 28, wherein step (C) includes establishing a link between the main and secondary storage devices across which the reformatted data is transferred, and wherein the method further includes a step of disconnecting the link after the reformatted data is transferred to the main storage device.

30. The method of claim 24, wherein step (B) includes a step of performing normal operations on the main processor while reloading the data onto the secondary storage device.

31. The method of claim 30, wherein step (A) includes a step of performing normal operations on the main processor while copying the data in the initial format from the main storage device to the secondary storage device and transferring the data in the initial format from the secondary storage device onto the temporary storage medium.

32. The method of claim, wherein step (B) includes steps of:
    coupling the temporary storage medium to a secondary processor that is coupled to the secondary storage medium; and
    executing a reload operation on the secondary processor to reload the data from the temporary storage medium onto the target storage device.

33. The method of claim 32, wherein step (A) includes steps of:
    coupling the temporary storage medium to the secondary processor; and
    executing a back-up operation on the secondary processor to transfer the data from the secondary storage device to the temporary storage medium.

34. The method of claim 24, wherein step (A) includes steps of:
    coupling the temporary storage medium to the main processor;
    performing a back-up operation of the main storage device on the main processor; and
    resuming normal operations on the main processor.

35. The method of claim 34, further including, after step (B) and prior to step (C), steps of:
    stopping normal operations on the main processor;
    determining all data updates that occurred to the main storage device between a time at which normal operations on the main processor were resumed following the back-up operation and the stopping of normal operations of the main processor after the completion of step (B); and
    transferring the data updates to the secondary storage device.

36. The method of claim 34, wherein step (C) further includes steps of:
    establishing a link between the main and secondary storage devices; and
    transferring the reformatted data across the link from the secondary storage device to the main storage device.

37. The method of claim 36, wherein step (C) further includes a step of invalidating each entry in the main storage device prior to establishing the link.

38. The method of claim 36, further including a step of disconnecting the link after the reformatted data is transferred across the link to the main storage device.

39. The method of claim 34, wherein step (B) includes steps of:
coupling the temporary storage medium to a secondary processor coupled to the secondary storage medium; and
performing a reload operation on the secondary processor to reload the data from the temporary storage medium onto the secondary storage device.

40. The method of claim 39, further including a step of performing normal operations on the main processor while performing the reload operation on the secondary processor.

41. The method of claim 39, wherein step (C) includes a step of transferring the reformatted data from the secondary storage device to the main storage device so that the main processor can access the reformatted data from the main storage device.

42. The method of claim 39, wherein step (C) includes a step of physically replacing the main storage device with the secondary storage device so that the secondary storage device is reformatted data on the secondary processor accessible to the main processor.

43. The method of claim 24, wherein step (A) includes steps of:
coupling the secondary storage device to the main storage device;
copying the data in the initial format from the main storage device to the secondary storage device; and
transferring the data in the initial format from the secondary storage device onto the temporary storage medium.

44. The method of claim 43, wherein the step of coupling the secondary storage device to the main storage device includes establishing a link between the main and secondary storage devices, and wherein the method further includes a step of, before executing step (B), disconnecting the link.

45. The method of claim 44, wherein step (C) further includes steps of:
re-establishing the link between the main and secondary storage devices; and
transferring the reformatted data across the link from the secondary storage device to the main storage device.

46. The method of claim 45, wherein step (C) further includes a step of invalidating each entry in the main storage device prior to re-establishing the link.

47. The method of claim 45, further including a step of disconnecting the link after the reformatted data is transferred across the link to the main storage device.

48. The method of claim 44, further including, prior to step (C), steps of:
determining all data updates that occur to the main storage device between a time at which the link is disconnected and completion of the reloading of the data in step (B); and
transferring the data updates to the secondary storage device.

49. The method of claim 48, wherein the step of transferring the data updates to the target storage device includes steps of:
coupling a temporary storage medium to the main processor;
performing an incremental back-up operation on the main processor to back-up the data updates on the main storage device onto the temporary storage medium; and
transferring the data updates from the temporary storage medium to the secondary storage device.

50. The method of claim 48, further including a step of, prior to the step of determining all data updates, stopping normal activity on the main processor to prevent additional data updates to the main storage device.

51. The method of claim 50, wherein step (C) further includes steps of:
re-establishing the link between the main and secondary storage devices; and
transferring the reformatted data across the link from the secondary storage device to the main storage device.

52. The method of claim 51, wherein step (C) further includes a step of invalidating each entry in the main storage device prior to re-establishing the link.

53. The method of claim 52, further including a step of resuming normal operations on the main processor after each entry in the main storage device has been invalidated and the link has been re-established.

* * * * *